Patented Feb. 12, 1952

2,585,196

UNITED STATES PATENT OFFICE 2,585,196

ALKALI RESISTANT ALKYLENE POLYAMINE MODIFIED PHENOL - FORMALDEHYDE RESIN

Richard K. Walton, Montclair, N. J., assignor, by mesne assignments, to Union Carbide and Carbon Corporation, a corporation of New York No Drawing. Application March 13, 1946, Serial No. 654,229

22 Claims. (Cl. 260—33.2)

This invention is concerned with fusible, heat-convertible, alkylene polyamine modified phenol-formaldehyde resins, that when heat-converted within certain time and temperature limits to an infusible and insoluble condition have a resistance to aqueous alkali or acid reagents superior to conventional phenol-formaldehyde resins.

The invention is dependent upon several discoveries jointly contributing to the production of the modified phenol-formaldehyde resin in a stable, fusible, heat-convertible form enabling it to be used as a thermosetting coating material or impregnant when dissolved in suitable solvents, or as a solid fusible binder in the manufacture of thermosetting molding compositions, and finally, to the development of maximum alkali and acid resistance in the resins when heat-converted to the insoluble and infusible condition.

As one of these discoveries, it has been found that stable, heat-convertible resins can be obtained by reacting at low to moderate temperatures an alkylene polyamine with methylol substituted condensation products of phenols and formaldehyde, such products including the simple phenol alcohols as well as their fusible resinous condensation derivatives containing methylol groups. Alternatively the methylol substituted phenols can be reacted with the methylol substituted compounds of the alkylene polyamines. In either procedure it is essential that free formaldehyde, if present, while the methylol substituted phenol is being reacted with the amine or its methylol compound be limited to a quantity not in excess of about one mol per mol of the polyamine, for otherwise the usual exothermic reaction in the presence of these amines proceeds so violently that gelation of the reaction mass occurs almost immediately or before the reaction mixture can be dehydrated. However, after a resin yielding reaction has taken place between the methylol substituted phenol condensate and the polyamine, additional formaldehyde in aqueous, gaseous or anhydrous polymeric form, or as a derivative, such as hexamethylenetetramine, may be added in limited amounts unattended by objectionable gelation or storage instability of the fusible resin before it is to be heat-converted.

The chemical resistance of the resins when heat-converted, particularly to alkalies, is dependent upon the procedure used for making the resins as well as upon the proportions of the reactants phenol, formaldehyde and polyamine to each other. But of critical importance as to the development of maximum chemical resistance in the heat-converted resin are the temperature and duration of the heat-converting step. In general, for the various species of resins prepared in accordance with the invention as herein disclosed, it has been found that the resins should be heat-converted at a temperature of at least 160° C., and preferably between 175° C. and 200° C. for maximum chemical resistance. At temperatures below 160° C. the resins are heat-converted to insoluble masses, but their chemical resistance is negligible and of no significant difference from unmodified phenol-formaldehyde resins. Likewise temperatures above 220° C. are unsatisfactory because chemical resistance is rapidly lost presumably due to heat degradation of the resin. At any given constant heat-converting temperature, chemical resistance of a modified resin increases as the resin is exposed to longer curing cycles, reaching a maximum for that temperature and then decreasing as the curing cycle is further prolonged. The best chemical resistance for practically all of the modified resins is obtained by heat-converting the resins at about 190° C. for about 5 to 15 minutes.

The proportion of alkylene polyamine to the phenol methylol substituted condensate is critical in that with less than $1/f$ molar quantity of amine (where $f$ is an integer more than 2 and equal to the total number of replaceable hydrogen atoms attached to amino or imino nitrogen atoms in the polyamine) per phenolic hydroxyl (or phenylol group) of the phenol reacted in the phenol-methylol substituted condensate, there is no appreciable improvement of the phenol-aldehyde resin; on the other hand, when more than a mol of alkylene polyamine is reacted per phenolic hydroxyl, resins are obtained exhibiting not only poor resistance to alkali and acid reagents, but also swelling of such magnitude when immersed in water, that they are unsuitable for technical applications, such as coatings or binders in molded or laminated articles.

Optimum chemical resistance has been found in those resins having proportions of alkylene polyamine to the substituted phenol-methylol condensate as expressed in the molar equation $1/n$ mol of amine per phenolic hydroxyl (or phenylol group) of the phenol reacted in the methylol condensate, $n$ being an integer more than 1 and representing the total number of amino and imino groups in the polyalkylene amine.

The alkylene polyamines found operable for the purposes of the present invention are preferably open chain aliphatic compounds having two or more primary amino groups (NH₂) and may contain one or more imino groups (NH). Illustrative of the compounds coming within the purview of this description are ethylene diamine, 1,3 diamino propane, 1,2 diamino propane, diethylene triamine, triethylene tetramine, tetraethylene pentamine and 1,6 hexamethylenediamine. Alkylene compounds having only a plurality of imino groups, such as 3,3' di(ethylamine) dipropylamine, yield heat-convertible resinous reaction products with methylol-containing phenols, which have a lower order of resistance to alkali reagents as compared to resins modified with alkylene polyamines containing one or more primary amino groups.

The phenols having utility for conversion into methylol-substituted condensates reactive with the alkylene polyamines are preferably those having available for substitution the hydrogens in the three particularly reactive positions on the ring, i. e., ortho and para to the hydroxy groups as exemplified, by the monocyclic, monohydroxy phenols, such as phenol itself, meta cresol and 3,5 xylenol. Ortho and para substituted cresols and xylenols may be present in conjunction with a more reactive phenol but due to limited functionality their reaction with formaldehyde tends to yield resins of the thermoplastic type when used as the major phenol component. Polyhydroxy monocyclic phenols, such as resorcinol, hydroquinone and pyrogallol are too highly reactive for the purposes of the present invention, yielding compositions having poor storage stability as well as poor light resistance and color.

Useful phenol reactants, other than the preferred monocyclic monohydroxy phenols, are the polyhydroxy polyarylmethanes, such as the isomeric dihydroxy diphenyl methanes, especially the 2,2' and 2,4' derivatives, the diphenylol ethanes, the dihydroxy diphenyl dimethyl methanes, the diphenylol propanes, and the dicresyl and dihydroxyxylenyl methane derivatives, for all are characterized by having at least three reactive positions available for replacement of the hydrogen and are reactive with formaldehyde or its methylene-yielding derivatives to produce heat-convertible resins.

The formation of suitable phenol methylol substituted condensates from reactive phenols and formaldehyde is promoted by basic catalysts, such as ammonium hydroxide, its derivatives including, hexamethylenetetramine, quaternary ammonium bases, and amines, the hydroxides of sodium and potassium, and the basic oxides, such as zinc oxide, calcium oxide, magnesium oxide and the like.

At least one mol of formaldehyde per mol of a phenol as heretofore described is used to promote maximum yields of methylol derivatives and minimum yields of non-heat reactive aryl methanes. The maximum quantity of formaldehyde for reaction with the phenol in excess of equimolar proportions is limited to a quantity not in substantial excess of two mols per mol of the polyamine subsequently reacted with the methylol substituted phenol in order that fusible resins can be obtained when the polyamine is reacted with the phenol methylol substituted condensate. To illustrate these proportions, a methylol substituted phenol condensate prepared from one mol of phenol ($C_6H_5OH$) and up to 1.66 mols of formaldehyde can be reacted with 0.33 mol of alkylene polyamine to obtain heat-convertible fusible resins; a methylol substituted phenol condensate prepared by reacting together one mol phenol ($C_6H_5OH$) and up to 2.0 mols of formaldehyde can be reacted with 0.5 mol of alkylene polyamine to yield a resin in fusible form; and a methylol substituted phenol condensate of one mol phenol ($C_6H_5OH$) and up to 3 mols formaldehyde can similarly be reacted with 1.0 mol of alkylene polyamine.

When the methylol substituted phenol condensate that is reacted with the polyamine is made with equimolar proportions of formaldehyde and a phenol, the resultant resin is only slowly heat-converted and exhibits merely fair chemical resistance. The addition of more formaldehyde or other methylene engendering agent to such resinous reaction products of the polyamine and the methylol substituted phenol is accordingly desirable to speed up the rate of heat-conversion and to improve the chemical resistance, these properties improving progressively as the amount of subsequently added formaldehyde becomes equivalent to two mols or two methylene groups per mol of reacted polyamine.

The primary condensation reaction between the phenol and formaldehyde can be interrupted at any stage between the initial production of substantially non-resinous methylol phenols or phenol alcohols and the fusible heat-convertible resin resulting from further condensation of the phenol alcohols with each other, and these products can be either in an aqueous or a dehydrated condition when reacted with the polyamine. However, the dehydrated fusible resins containing some methylol groups can be reacted at higher temperatures with the polyamines and with better control of the reaction than the undehydrated resins or phenol alcohols. Furthermore, as the unmodified phenol-formaldehyde resins are further heat-reacted but at any stage short of being converted into a "B" type resin before the polyamine is added thereto, higher molecular weight fusible condensation polymers that are solid and brittle at room temperatures can be made in the subsequent reaction with the polyamine; and these polymers when heat-converted are in several respects superior to the heat-converted polyamine modified reaction products of lower molecular weight methylol substituted phenol condensates, such reaction products before heat-conversion being viscous to liquid resins at room temperatures.

That the initial methylol group forming reaction between the phenol and formaldehyde is an essential step in the process is further exemplified from the study of reactions solely between a pure phenol and a condensate of polyamine and formaldehyde, which although yielding a heat-convertible resin, such resin in the infusible and insoluble condition has practically no resistance to aqueous alkalies, and likewise when the phenol is initially reacted with the polyamine and then with formaldehyde, heat-convertible resins are obtained also exhibiting mediocre resistance to aqueous alkalies after being heat-converted. The simultaneous reaction of phenol, polyamine and formaldehyde also yields heat-convertible resins characterized by poor resistance to aqueous alkalies after being heat-converted.

From a structural viewpoint it is postulated that in the optimum ratio of alkylene polyamine reacted with a dehydrated resinous methylol substituted condensate of phenol and formaldehyde, the reaction in its simplest form may proceed with diethylenetriamine as the particular polyamine, as follows:

A.
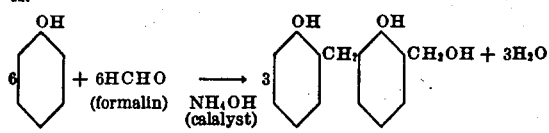

B.
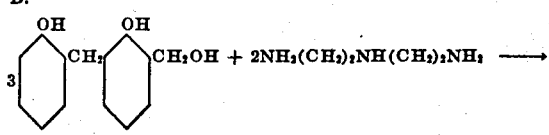

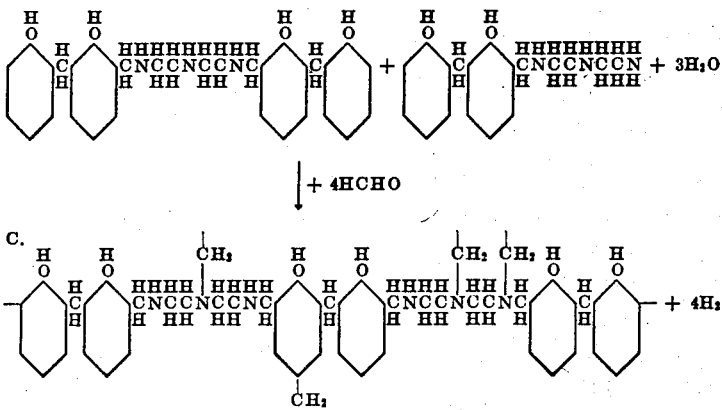

As indicated in the structural formula, the 4 mols of formaldehyde in the form of paraform probably cross-link linear chains of phenyl rings that are alternately bridged by methylene groups and alkylene polyamine residues to form a three dimensional type of polymer. It is believed that in the absence of free formaldehyde the alkylene polyamine and the phenol methylol condensate react initially to form predominantly linear chains, whose average lengths are probably much longer than depicted in the formula for stage B. and that cross-linking is suppressed in this stage. But upon the addition of formaldehyde or other methylene engendering agent, cross-linking is then promoted under controllable conditions to yield as the end result with continued reaction at suitable temperatures, a physically strong and chemical resistant complex three dimensional type infusible and insoluble polymer.

The amount of formaldehyde or other methylene engendering agent which can be added for cross-linking under controllable conditions to yield a fusible heat-convertible product is limited to a maximum of about that contributing two methylene groups per mol of reacted alkylene polyamine when the initial methylol substituted phenol condensate was prepared from equimolar quantities of formaldehyde and a suitable phenol. With larger amounts of methylene engendering agent, the reaction products have poor storage stability, gelling when in solvent solution or becoming infusible when in the solid form at room temperatures. With methylol substituted phenol condensates of phenols and formaldehyde wherein the aldehyde is reacted in excess of molar quantities to form at least as initial condensation products phenol alcohols having a plurality of methylol groups, the amount of methylene engendering agent subsequently added to the reaction product with the polyamine is decreased in proportion to the initial excess of formaldehyde over molar equivalents.

Depending upon the ultimate use of the alkylene polyamine modified phenol-aldehyde resins, their method of manufacture is varied to suit the particular requirements of such end uses as binders in thermosetting molding compositions, impregnants for paper or textile fabric in the production of laminated structures, as thermosetting adhesives for joining wood, metal and plastics, and as chemically resistant baking coatings for metal, and other surfaces which can be subjected without injury to baking temperatures of at least 160° C.

As a fusible binder in thermosetting molding compositions, the polyamine modified resin can be admixed in liquid form or as a solvent solution with the conventional fillers, followed by evaporation of the solvent at temperatures retaining fusibility of the resin to produce a dry molding composition. Dehydrated solid polyamine modified resin may be fluxed on hot-mixing rolls or in heated kneaders for admixture with fillers, and additional methylene engendering agent may be added during the compounding to cause partial advancement of the resin towards the B stage, thereby reducing the curing time of the molding composition in the mold.

In the application of alkylene polyamine modified phenolformaldehyde resin as impregnants or binders in laminated structures, a short reaction between the amine and the methylol substituted phenol is preferred because these initial resinous products are soluble in cheap solvents, such as water, alcohols, esters and mixtures thereof. Thus, when a methylol substituted phenol is reacted with an alkylene polyamine for about 5–10 minutes at about 80° C., resinous products are obtained which can be dissolved in water to form an impregnating solution. Prolonging the reaction time decreases the water solubility and stronger solvents such as the lower monohydric alcohols or their fatty acid esters must be used, either in admixture with water or per se to obtain a homogeneous solution. Solvents for this application are selected on the basis of their boiling point, the desideratum being the rapid elimination of the solvent from the impregnated paper or textile at temperatures low enough to avoid converting the resin to the infusible stage prior to the actual laminating pressing operation. Water, methyl, ethyl, propyl and butyl alcohols and their fatty acid esters, such as the acetates or propionates having boiling points below about 150° C. are satisfactory solvents for the fusible polyamine modified resins.

Preparation of alkylene polyamine modified resins for use as baking coatings requires a more prolonged initial reaction of the polyamine and methylol substituted phenol condensate before heat-conversion than for any of the previously mentioned uses. For this use it has been found that the polyamine modified resin must be initially reacted to a stage where it is no longer soluble in the aforementioned monohydric alcohols or their esters per se but is still soluble in stronger solvents such as dioxane and glycol or polyglycol monoethers, such as ethylene glycol monoethyl ether, ethylene glycol monobutyl ether, and like monohydroxy ethers having a boiling point at atmospheric pressure below the charring or decomposition point of these resins which is about 300° C. when exposed for approximately 30 minutes. The longer reaction time results in resins that in solution in the aforedescribed solvents deposit smooth films on metal surfaces and which when baked do not crawl, alligator, or form "eyes" or craters (descriptive terms for bare spots on the metal surfaces). Resins reacted to this stage are not directly soluble in water or the simple alcohols and their esters, however, they may be added as diluents to a solution of the resin in dioxane or a glycol monoether.

In illustration but not in limitation of the invention, the following examples supplement the description hitherto given.

EXAMPLE 1

In a five liter flask fitted with a reflux condenser and stirring equipment, 940 grams, (10 mols) of phenol (C₆H₅OH), 810 grams (10 mols) aqueous formaldehyde (37%), and 37.6 grams of aqueous ammonia (28%) as a catalyst were reacted by heating to refluxing temperatures until analysis showed practically all the formaldehyde had reacted with the phenol. The resultant resinous syrup was dehydrated by being heated to 50° C. while maintained under subatmospheric pressure of 2 inches mercury. There was then added to the dehydrated resin a solution of 343 grams (3.3 mols) of diethylene triamine in 300 grams of ethylene glycol monoethyl ether, and heated for 15 minutes under atmospheric reflux to 100° C. The reaction mass was then cooled to 60° C. and a slurry of 200 grams (6.7 mols) of paraformaldehyde in 1000 grams of ethylene glycol monoethyl ether was added thereto and reacted therewith by heating at about 80°–85° C. under subatmospheric pressure of 3 inches' mercury pressure while eliminating continuously water of condensation until the resin gelled within 15 to 30 seconds when tested on a hot plate at 160° C. An additional 500 grams of ethylene glycol monoethyl ether were then added to chill the solution to a non-reactive temperature. The chilled resinous solution had a light amber color, a viscosity of about 200 centipoises and a solids content of 42% as determined by baking a 10 gram sample in an open dish for 3 hours at 135° C.

The resin solution could be applied as a coating on steel or other metals by dipping, brushing or spraying. To obtain maximum alkali and acid resistance, the coatings were baked for 15 minutes at 190° C.; the baked films resisted a 5% aqueous solution of sodium hydroxide at refluxing temperatures for at least 16 hours before failure occurred by loss of adhesion to the steel surface and not by decomposition of the resin film.

Applying the same caustic test to 0.5 mil thick films of this resin baked on steel panels at other temperatures and for different baking times, as set forth in Table I, revealed the critical nature of the heat-converting step.

Table I

| Baking— | | Resistance in hrs. to refluxing 5% aqueous NaOH before film failure |
|---|---|---|
| Temperature | Time | |
| °C. | | |
| 120 | 2 hrs. | 0.18 |
| 120 | 12 hrs. | 0.2 |
| 120 | 24 hrs. | 0.18 |
| 135 | 1 hr. | 0.25 |
| 135 | 4 hrs. | 0.25 |
| 150 | 30 min. | 0.25 |
| 150 | 2 hrs. | 2.1 |
| 150 | 12 hrs. | 1.0 |
| 150 | 24 hrs. | 0.25 |
| 160 | 20 min. | 0.75 |
| 160 | 40 min. | [1] 5.0 |
| 175 | 15 min. | 8.0 |
| 175 | 30 min. | [1] 9.75 |
| 175 | 1 hr. | [1] 3.0 |
| 175 | 4 hrs. | [1] 1.8 |
| 190 | 5 min. | [1] 11.0 |
| 190 | 15 min. | [1] 16.0 |
| 190 | 30 min. | [1] 9.0 |
| 190 | 1 hr. | [1] 7.0 |
| 190 | 4 hrs. | 1.25 |
| 220 | 5 min. | 2.1 |
| 220 | 30 min. | 2.5 |

[1] Films lost adhesion, but otherwise still intact.

Inspection of these results shows that a heat-converting temperature of below 160° C., no matter how long prolonged is ineffective in developing the caustic resistance obtained by heat-converting at temperatures between 160° C. and 220° C.

EXAMPLE 2

A resin in solution form was prepared as before with the same reactants and proportions as in Example 1 with the sole exception, however, that instead of two mols of paraformaldehyde per mol of alkylene polyamine, only 1 mol of paraform per mol of amine was added. Decreasing the amount of methylene cross-linking agent resulted in a lower resistance towards alkali since the resin when baked as a film on a steel plate (15 minutes at 190° C.) exhibited satisfactory resistance to refluxing 5% aqueous sodium hydroxide solution for only 8 hours before decomposition began.

EXAMPLE 3

A resin in solution form was prepared from the same reactants and proportions as in Example 1 except that no paraform or other methylene engendering agent was added to the reaction product of the diethylene triamine and methylol phenol condensate. This resin was heat-convertible, but yielded baked films on steel panels resistant to refluxing 5% aqueous sodium hydroxide solution for only 0.75 hour before decomposition occurred.

The foregoing examples illustrate the effect of different amounts of methylene-yielding agent added to a polyamine modified phenol methylol condensate of equi mols phenol and formaldehyde. In the following examples there are shown the effects of different amounts of alkylene polyamine added to the same amount of phenol methylol condensate and with the methylene agent in proportion to yield two methylene groups per mol of the amine.

EXAMPLE 4

A phenol methylol condensate was prepared as in the initial part of Example 1 and then reacted as before in the presence of ethylene glycol monoethyl ether with diethylene triamine in proportions between 0.05 mol and 1.0 mol per mol of phenol reacted in the condensate. Paraform was added to each reaction product of phenol methylol condensate and polyamine in the proportion of 2 mols per mol of diethylene triamine and reacted therewith until resins having a gelation time of about 30 seconds at 160° C. were obtained. Each resin in solution in ethylene glycol monoethyl ether was applied to steel panels, baked for 15 minutes at 190° C., and then tested for resistance to refluxing 5% aqueous sodium hydroxide solution. The results are tabulated in Table II with respect to the molar ratio of reactants.

Table II
MOLAR RATIO

| Example | Phenol | Diethylene Triamine | Paraform | Film Failure Hrs. in Refluxing 5% NaOH Solution | Type of Failure |
|---|---|---|---|---|---|
| 4 (a) | 1.0 | 0.05 | 0.1 | 0.2 | Film decomposed. |
| 4 (b) | 1.0 | 0.1 | 0.2 | 0.75 | Do. |
| 4 (c) | 1.0 | 0.2 | 0.4 | 2.8 | Loss of adhesion. |
| 4 (d) | 1.0 | 0.33 | 0.66 | 14.5 to 34 | Do. |
| 4 (e) | 1.0 | 0.5 | 1.0 | 5.0 | Do. |
| 4 (f) | 1.0 | 0.67 | 1.34 | 4.5 | Do. |
| 4 (g) | 1.0 | 1.0 | 2.0 | 0.33 | Do. |

Interpreting the table, it is observed that resins made with less than 0.2 mol of amine per mol of reacted phenol which corresponds to a molar ratio of $1/f$ mol amine per mol of reacted phenol where $f=5$ (the total number of replaceable hydrogen atoms attached to amino and imino nitrogen atoms in the diethylene triamine), have no significant resistance to the alkali. But with increasing amounts of the polyamine, alkali resistance increases reaching a peak value when 0.33 mol of amine was present per mol reacted phenol, corresponding to a ratio of $1/n$ mol of amine per mol of reacted phenol where $n$ represents 3, the total number of primary amino groups and secondary amino or imino groups in the diethylene triamine. With amounts above 0.33 mol of amine per mol of reacted phenol, alkali resistance decreases again, to such an extent that 1 mol of amine per mol reacted phenol is indicated as being the maximum amount for resins having some utility as chemically resistant coatings.

The same molar relationships as expressed with reference to $f$ the total of replaceable hydrogen atoms and to $n$ the number of amino and imino groups has been found to apply to other alkylene polyamines which similarly exhibit maximum chemical resistance when present in a molar quantity of $1/n$ mol per mol of reacted phenol and decreasing resistance on either descending or ascending amounts from the $1/n$ mol quantity between $1/f$ mol to 1 mol per mol of reacted monocyclic phenol or phenolic hydroxyl group.

EXAMPLE 5

A phenol methylol condensate was prepared by refluxing together 94 grams (1 mol) of phenol and 81 grams (1 mol) formalin in the presence of 3.7 grams aqueous ammonia (28%) as catalyst. Upon the reaction mass exhibiting a refractive index of about 1.540 indicating substantially complete reaction of the phenol with the formaldehyde, it was dehydrated by heating in vacuo (2 inch mercury pressure) and to a temperature of 50° C. There was then added to the dehydrated resinous reaction mass a solution consisting of 116 grams (1 mol) of 1,6 hexamethylenediamine and 50 grams of ethylene glycol monoethylether causing a slight exothermic reaction increasing the temperature to 70° C. Heat was applied and the polyamine was further reacted with the phenol methylol condensate for 15 minutes at 100° C. Thirty grams (1 mol) of paraform in a slurry made by admixture with 200 grams of ethylene glycol monoethylether were then added and reaction continued for 4 hours at 100°–110° C. until a resin having a gel time at 160° C. of 135 seconds was obtained. In replacement for some of the paraform that had sublimed or was otherwise lost during the reaction, an additional 15 grams of paraform were added and reacted with the resin at 80° C. until the gel time at 160° C. had decreased to 30 seconds. The solution of resin in the glycol ether was applied as a 0.5 mil thick film on a steel plate and baked at 190° C. for 5 minutes to convert the resin to its insoluble and infusible form. The baked film had sufficient flexibility and adherence to the steel to be flexed over a standard cone mandrel test form without any visible rupture or flaking off of the film. Alkali resistance of the coating to refluxing 5% aqueous sodium hydroxide solution was only fair being less than 1 hour. Similar flexible properties are obtained in resins modified with other alkylene polyamines when a molar proportion of the amines is reacted per phenolic hydroxyl of the reacted phenol and with the addition of lower amounts of formaldehyde or paraform as a cross-linking agent such as 1 mol per mol of the amine.

EXAMPLE 6

In duplication of Example 5, the phenol-methylol condensate so prepared was reacted with only half the quantity of 1,6 hexamethylene-diamine, e. g., 58 grams (½ mol), and then with 20 grams (⅔ mol) of paraform to obtain a clear resin soluble in ethylene glycol monoethyl ether and having a gel time at 160° C. of about 25 seconds. Films deposited from such a solution on steel and baked at 190° C. for 10 minutes exhibited at least 8½ hours resistance to refluxing 5% aqueous sodium hydroxide solution.

EXAMPLE 7a

Two hundred and twenty-eight (228) grams (1 mol) $p,p'$ dihydroxydiphenyl-dimethylmethane and 108 grams (1.33 mols) of formalin were reacted together in the presence of 8.2 grams aqueous ammonium hydroxide (28%) as a catalyst by refluxing for 15 minutes, and then dehydrating under subatmospheric pressure of 8 inches mercury pressure and by heating to 70° C. To this methylol condensate there was added a solution of 50 grams ethylene glycol monomethyl ether and 34 grams (0.33 mol) diethylene triamine (equivalent to 0.165 mol of amine for each of the hydroxyls in the dihydroxydiphenyl methane) and the mixture heated to 100° C. for 15 minutes. The reacted mixture was then cooled to 40° C. and a slurry of 20 grams (0.67 mol) of paraform in 200 grams ethylene glycol monoethyl ether was added. The mixture was heated to 90° C. while under sub-atmospheric pressure of 4 inches mercury pressure to cause dehydration and until the clear resinous mass had a gel time at 160° C. of 19 seconds. It was then cooled and thinned with an additional 100 grams of ethylene glycol monoethyl ether. Coatings prepared by dipping steel panels into the resin solution and then baking for 15 minutes at 190° C. had a resistance of 1½ hours to refluxing 5% aqueous sodium hydroxide solution.

EXAMPLE 7b

Repeating Example 7a, except that a preferred ratio of 68 grams (0.67 mol) of diethylene triamine, equivalent to 0.33 mol of amine for each of the hydroxyls in the dihydroxy diphenyl methane or a 1/n molar quantity (where n=3 since this amine has a total of 3 amino groups) and 40 grams (1.33 mols) paraform, equivalent to 2 mols per mol amine were used and reacted in solution in the same manner, resulted in a resin having a gel time at 160° C. of 22 seconds was obtained. This resin in solution form produced coatings when baked on steel for 15 minutes at 190° C., having a resistance to refluxing 5% aqueous sodium hydroxide solution exceeding 8½ hours before failure occurred by loss of adhesion to the steel.

EXAMPLE 8

An ethylene diamine modified phenol aldehyde resin was prepared by initially reacting together 94 grams phenol and 81 grams formalin (37%) in the presence of 3.7 grams aqueous ammonia (28%) as a catalyst to form a resin having methylol groups which was vacuum dehydrated by heating to 50° C. To the dehydrated syrupy phenol-formaldehyde resin there were added 43.5 grams of an aqueous solution of ethylene diamine and 40 grams ethylene glycol monoethyl ether and reacted together for 15 minutes at 100° C. Then 20 grams (⅔ mol) of paraform in a slurry form with 200 grams ethylene glycol monoethyl ether were added and reacted with the other components by refluxing for 1¼ hours until the resin in solution had a gel time of about 18 seconds at 160° C. This resin in solution applied as a coating to steel panels and baked 15 minutes at 190° C. resisted refluxing 5% aqueous sodium hydroxide solution for 12 hours before failure occurred by loss of adhesion.

EXAMPLE 9

A phenol-formaldehyde resin was prepared in the same manner and quantity as in Example 8, and after dehydration there were added to it 50 grams ethylene glycol monoethyl ether and 86 grams (1 mol) ethylene diamine. The reaction mixture was heated to 100° C., held there for 15 minutes, then cooled to 50° C., whereupon 40 grams paraform and an additional 50 grams of the ether were added to the reaction mixture which was then reheated to 70°–80° C. while being dehydrated in vacuo (4″ mercury pressure) until the resin had a gel time of 22 seconds at 160° C. The resin was then further diluted by the addition of 100 grams more of the ether solvent. Applying the resin solution as an 0.5 mol thick film on a steel panel, and baking for 15 minutes at 190° C., yielded a baked coating having resistance to refluxing 5% aqueous sodium hydroxide solution of at least 7 hours.

Films from the resins prepared in Examples 8 and 9 were baked on steel panels at different temperatures and baking times, and were then tested by immersion in refluxing 5% aqueous sodium hydroxide solution. The results as shown in Table III further illustrated the critical nature of the heat-converting cycle for these polymine modified phenol-formaldehyde resins.

Table III

| Baking— | | Resistance in hrs. to refluxing 5% aqueous NaOH before film failure | |
|---|---|---|---|
| Temperature | Time | Resin from Example 8 | Resin from Example 9 |
| °C. | | | |
| 135 | 1 hr. | 0.1 | 0.18 |
| 135 | 4 hrs. | 0.2 | 0.25 |
| 150 | 30 min. | 0.15 | 0.18 |
| 175 | 15 min. | ¹8.0 | 6.0 |
| 175 | 30 min. | ¹8.0 | ¹7.25 |
| 175 | 1 hr. | ¹7.0 | ¹6.0 |
| 175 | 4 hrs. | ¹1.75 | ¹1.0 |
| 190 | 5 min. | ¹16.0 | ¹7.25 |
| 190 | 15 min. | ¹15.0 | ¹7.0 |
| 190 | 30 min. | ¹8.0 | ¹7.25 |
| 190 | 1 hr. | ¹6.0 | ¹3.5 |
| 190 | 4 hrs. | 5.0 | 2.5 |
| 220 | 5 min. | 0.75 | 1.4 |
| 220 | 30 min. | 0.6 | 0.5 |

¹ Films lost adhesion but were otherwise intact.

EXAMPLE 10

A dehydrated 1:1 molar phenol-formaldehyde condensate prepared as in Example 8 was reacted with 36 grams (¼ mol) triethylenetetramine in the presence of 30 grams ethylene glycol monoethyl ether by heating for 15 minutes at 100° C. The reaction mass was then cooled to 70° C. and 15 grams (½ mol) of paraform suspended as a slurry in 200 grams ethylene glycol monoethyl ether were added thereto and reacted by heating to 100° C. for ½ hour. The resulting resin in solution formed coatings on steel which after baking for 15 minutes at 190° C. satisfactorily resisted refluxing 5% aqueous sodium hydroxide solution for at least 11 hours before failure occurred by loss of adhesion. Other coated panels immersed in concentrated (95%) sulfuric acid at room temperature showed no decomposition of the coating after exposure for 1000 hours.

EXAMPLE 11

Substituting 38 grams (⅕ mol) of tetraethylene pentamine for the triethylene tetramine and using only 12 grams (⅖ mol) of paraform for the polymine and paraform reactants given in Example 10, a resin soluble in ethylene glycol monoethyl ether was obtained, which as a baked coating on steel resisted for 8 hours refluxing 5% aqueous sodium hydroxide solution before failure resulted due to loss of adhesion, and resisted concentrated sulfuric acid at room temperature for more than 1000 hours.

EXAMPLE 12

Substituting 62 grams (½ mol) 3,3′ di(ethyl amino) dipropyl amine (a polyfunctional amine having only imino groups) for the triethylene tetramine added to the phenol methylol condensate of Example 10 and increasing the quantity of paraform to 20 grams (⅔ mol), a resin soluble in ethylene glycol monoethyl ether was obtained having gel time of about 30 seconds at 160° C. Baked as a coating for 15 minutes at 190° C. on steel plate, the heat-converted resin had a useful life of 3 hours in refluxing 5% aqueous sodium hydroxide solution and of 1½ hours when immersed in concentrated sulfuric acid at room temperature.

EXAMPLE 13

Reacting 37 grams (½ mol) of 1,3 diamino propane with the dehydrated phenol-formaldehyde condensate of Example 8 in the presence of 30 grams ethylene glycol monoethyl ether for 15 minutes at 100° C. yielded a clear resinous solution. This was further reacted with a slurry of 20 grams (⅔ mol) of paraform in 200 grams ethylene glycol monoethyl ether for 1¾ hours at a refluxing temperature of 100° C. subsequently increased to 109° C. for 1⅔ hours. An additional 10 grams of paraform was then added to compensate for loss of paraform during the prolonged refluxing cycle. The resulting amber colored solution of resin in the glycol solvent was baked for 15 minutes at 190° C. as a coating on steel panels. The baked coating exhibited good resistance to a refluxing 5% aqueous sodium hydroxide solution, failing only after 15 hours exposure and then only by loss of adhesion to the steel surface and not by decomposition of the film.

EXAMPLE 14

A fusible, heat-hardenable phenol-formaldehyde resin was prepared by reacting together 1 mol phenol and 1.67 mols aqueous formaldehyde in the presence of 1% sodium hydroxide as a catalyst until a resin having a gel time of about 60 seconds was obtained. The resin was dehydrated in vacuo until it had a water content of about 2–3% as determined by the Karl Fischer method. The dehydrated phenolic resin was then reacted with 0.33 mol of diethylene triamine in the presence of ethylene glycol monomethyl ether as a solvent reaction medium, until the reaction product had a gel time of about 20 seconds at 160° C. It was then further diluted with more of the ether to a solids content of 35%. Applied as a coating on steel panels, and heat-converted by baking for 15 minutes at 190° C., yielded a film resistant to refluxing 5% aqueuos sodium hydroxide solution for at least 7½ hours before losing adhesion to the steel surface.

EXAMPLE 15

A 1:1 molar phenol-formaldehyde condensate prepared as in Example 8 was reacted with 34 grams (0.33 mol) of diethylene triamine in the presence of 50 grams dioxane by heating to 100° C. for 15 minutes. Then 20 grams (⅔ mol) of paraform as a slurry in 150 grams of dioxane was added to the reaction mass at 40° C. which was then heated to 110° C. to dehydrate the mass and held there until the resinous solution had a gel time of 23 seconds at 160° C. The resinous solution was cooled, an addition 100 grams of dioxane were added to yield a clear solution. On further thinning with dioxane, the solution became cloudy and with increasing amount of dioxane part of the resin precipitated but could be redissolved when ethylene glycol monoethyl ether was added to the mixture.

EXAMPLE 16

A cresol methylol condensate was prepared by refluxing together for one hour 81 grams (1 mol) of formalin and 108 grams (1 mol) of a isomeric cresol mixture (consisting of 30–40% meta cresol, 21–27% paracresol, 16–22% ortho cresol, 5–10% phenol and less than 12% of mixed xylenols) in the presence of 4.3 grams aqueous ammonium hydroxide as a catalyst. It was then dehydrated under subatmospheric pressure of 2 inch mercury pressure to 50° C., yielding a clear syrupy resin to which was added 34 grams (⅓ mol) diethylene triamine and 30 grams ethylene glycol monoethyl ether and reacted therewith by heating to 100° C. for 15 minutes. The reaction mixture was then cooled to 70° C. and 20 grams (⅔ mol) of parafrom as a slurry in 200 grams of ethylene glycol monoethyl ether was added thereto. The mixture was heated to 100° C. and held at this temperature for 45 minutes or until the resin had reacted in solution in the glycol sufficiently to yield coatings free from eyeing or crawling when baked at heat-converting temperatures. Coatings of the resin baked for 15 minutes at 190° C. resisted refluxing 5% aqueous sodium hydroxide solution for 7 hours.

EXAMPLE 17

A xylenol-formaldehyde condensate was prepared by refluxing together 122 grams (1 mol) meta-xylenol and 81 grams (1 mol) of formalin (37%) in the presence of 4.3 grams sodium hydroxide as a catalyst for 20 minutes until practically all the formaldehyde had been reached. The condensate was dehydrated by heating to 50° C. under subatmospheric pressure equivalent to 28 inches mercury. There was then added to the dehydrated condensate 34 grams (⅓ mol) of diethylene triamine and 30 grams ethylene glycol monoethyl ether and the mixture heated to 100° C. for 15 minutes, then cooled to 70° C. and admixed with 20 grams (⅔ mol) of paraform as a slurry in 200 grams ethylene glycol monoethyl ether. This mixture was then heated to 100° C. for 20 minutes yielding a clear amber color resinous solution having good coating propreties. Films of the resin solution baked on steel for 15 minutes at 190° C. had good resistance to refluxing 5% aqueous sodium hydroxide solution for at least 3 hours.

EXAMPLE 18

An alternative procedure for reacting together a phenolformaldehyde condensate with an alkylene polyamine consisted in preparing a phenolformaldehyde condensate by refluxing equi gram molar quantities of phenol and formalin until all the formaldehyde had been reacted and then dehydrating the condensate by heating to 110° C. under subatmospheric pressure of 2 inches' mercury pressure. The resin so obtained was additionally heated at 110° C. until it had a gel time of 60 seconds at 160° C., whereupon it was dissolved in 50 grams of ethylene glycol monoethyl ether. In a separate reaction vessel a slurry of 20 grams (⅔ mol) of paraform in 100 grams of ethylene glycol monoethyl ether at room temperature was slowly added to a solution consisting of 34 grams (⅓ mol) of diethylene triamine and 50 grams of ethylene glycol monoethyl ether. An exothermic reaction occurred raising the temperature of the mixture to 80° C. and forming a viscous, light colored resin in solution which was further reacted by being held at 80° C. for 15 minutes. The phenol-formaldehyde resin solution was then cold blended with the amine-formaldehyde resin solution, yielding a clear solution but having poor coating properties such as eyeing when baked on metal surfaces. Films deposited on steel from the mixed solution and baked for 15 minutes at 190° C. to convert the resin to an infusible and insoluble condition, where resistant to refluxing 5% aqueous sodium hydroxide solutions for 10 hours.

EXAMPLE 19

A phenol-formaldehyde resin was prepared by reacting together 94 grams phenol and 81 grams aqueous formaldehyde (37%) in the presence of ammonium hydroxide as a catalyst under atmospheric refluxing conditions until the resinous condensate had a refractive index of 1.540; it was then dehydrated by heating in vacuo (3 inch mercury pressure) up to a temperature of 70° C. The dehydrated resin was then reacted with 34 grams of diethylene triamine in the presence of 50 grams ethylene glycol monomethyl ether by heating to 100° C. for 15 minutes. The resin was then cooled to 50° C. and 15.6 grams of hexamethylenetetramine and 100 grams more of the ether were added. The resin was further reacted and dehydrated under vacuo to a temperature of 100° C. and held there until the resin had a gel time of 20 seconds at 160° C. The resultant resin solution at 44% solids content had a viscosity between 700–800 centipoises. Applied as a coating material on steel panels, the resin when baked for 15 minutes at 190° C. resisted refluxing 5% aqueous sodium hydroxide solution for 16½ hours.

EXAMPLE 20

(a) An undehydrated water-soluble phenol-formaldehyde resin containing 30% water and comprising the reaction product of 1 mol phenol and 1½ mols aqueous formaldehyde was prepared in the presence of caustic soda as a catalyst according to the method described in Meharg U. S. Patent No. 2,190,672. By slowly adding 0.25 mol of diethylene triamine to the liquid resin, the resultant exothermic reaction could be controlled, although the temperature rose rapidly to 90° C. The liquid resin thus obtained was soluble in water, alcohol and other polar solvents and in the liquid form is useful as a heat-hardenable alkali-resistant impregnant and binder in laminate constructions of paper, textiles, and the like. The liquid resin could be dehydrated in vacuo to a water content of less than 5% to obtain a solid, fusible, heat-reactive resin.

(b) With the same quantity of water-soluble phenol-formaldehyde resin it was found feasible to add slowly a full mol of diethylene triamine, and react it with the phenolic resin; and then add to this liquid reaction product 1.5 mols of aqueous formaldehyde to initiate cross-linking of the amine modified resin. The resultant resin in aqueous solution could be dehydrated in vacuo to yield a fusible, heat-reactive resin.

EXAMPLE 21

A polyamine modified phenol-formaldehyde resin in brittle form for compounding with molding fillers was prepared by reacting together 940 grams phenol and 740 grams aqueous formaldehyde in the presence of 22 grams hexamethylenetetramine as catalyst to form a viscous resin after dehydration. To this dehydrated resin there was added 340 grams diethylene triamine and reacted therewith for 15 minutes at 100° C. under reflux conditions. Then 100 grams paraform and 100 grams amyl alcohol (to assist in the dispersion of the paraform) were added to the resin and the resin was then reheated to 100° C. for 15 minutes until clarity was obtained. The resin was dehydrated in vacuo (2 inch mercury pressure) at a temperature up to 100° C. until a brittle resin having a gel time of 60 seconds at 160° C. was obtained. The brittle resin was comminuted to about 80 mesh size particles, and then admixed on heated rolls with filler and other molding material components as follows:

| | Parts by weight |
|---|---|
| Resin | 84.1 |
| Paraform | 5.9 |
| Lime | 2.0 |
| Stearic acid | 2.0 |
| Carbon black | 2.5 |
| Cotton flock | 3.5 |
| | 100.00 |

A blister free disc (⅛ x 2″) was compression molded from the composition by holding at a mold pressure of 3000 p. s. i. and a curing temperature of 160° C. for 15 minutes. Immersion of the disc in refluxing 5% aqueous sodium hydroxide solution for 29 hours caused no apparent decomposition of the disc, and only resulted in an 0.55% weight increase due to absorption. For comparison a disc prepared from a chemical resistant thermosetting molding material containing an equivalent quantity of unmodified meta xylenol formaldehyde resin as the binder had a weight increase of 1.5% when similarly exposed to the same reagent.

EXAMPLE 22

A resin solution adapted for impregnating paper, textile and asbestos sheets in the manufacture of laminated panels was prepared by reacting together under reflux conditions 188 grams phenol and 162 grams 37% aqueous formaldehyde in the presence of 8 grams aqueous ammonium hydroxide as a catalyst until the condensate had a refractive index of 1.545; whereupon it was dehydrated by heating to 70° C. in vacuo (3 inch mercury pressure). There were then added to the dehydrated resin 50 grams of ethanol and 68 grams diethylene triamine and the mixture reacted by heating to 92° C. under reflux conditions for 15 minutes. The reaction mixture was then cooled to 50° C. and 150 grams additional ethanol and 40 grams of paraform were added thereto and reacted therewith by heating under reflux at a temperature of 85° C. until the resin had a gel time of 35 seconds at 160° C. The resultant clear resinous solution tolerated an additional 20% quantity by weight of ethanol before its clarity was lost. The resin solution had good impregnating properties, and after impregnation of paper, etc., could be dried at elevated temperatures without unduly heat-advancing the resin so that the resin in the dried impregnated paper could flow to consolidate and bind the sheets when pressed together in a heated press. Laminates thus prepared at curing temperatures above 160° C. had excellent resistance to chemical reagents.

Alkylene polyamine modified resins prepared in accordance with the foregoing disclosure show greatly improved resistance to corrosive chemicals over unmodified heat-convertible phenol-aldehyde resins or phenol-aldehyde resins modified as by the addition of vegetable oils, or by other amines, such as the aromatic amines and aliphatic monoamines. The differences are shown in Tables IV and V which include data based upon the various resins applied as baked coatings to steel, the baking conditions being modified for each resin so as to yield coatings of maximum performance for each.

Table IV

ALKALI RESISTANCE (HOURS' RESISTANCE BEFORE FILM FAILURE OCCURRED)

| Coating Material | Refluxing 5% aqueous NaOH | 10% aqueous NaOH at 25° C. | 50% aqueous NaOH at 25° C. | 10% aqueous NH4OH at 25° C. |
|---|---|---|---|---|
| 1. Phenol-formaldehyde diethylene triamine resin (Example 1) | [1] 16-34 | [1] 3,500 | [2] | [3] |
| 2. Phenol-formaldehyde heat-hardenable baking lacquer | 0.01 | 0.8 | 28 | 150 |
| 3. Cresol-formaldehyde heat-hardenable baking lacquer | [1] 0.13 | 40 | 48 | 48 |
| 4. Cresol-formaldehyde heat-hardenable baking lacquer modified with 25% tung oil | 0.4 | 50 | 56 | 96 |
| 5. M-xylenol-formaldehyde heat-hardenable baking lacquer | [1] 2.2 | 150 | | |
| 6. Phenol-formaldehyde methylol reacted with triethyl amine (1:1:1 mols) | 0.02 | | | |
| 7. Phenol-formaldehyde methylol reacted with diethyl amine (1:1:1 mols) | 2.5 | | | |
| 8. Phenol-formaldehyde methylol reacted with aniline (1:1:1 mols) | 2.0 | | | |
| 9. Phenol-formaldehyde methylol reacted with melamine (1:1:0.33 mols) | 2.0 | | | |

[1] Failure by loss of adhesion.
[2] Slight pin point failing after 7 months.
[3] Okay after 7 months.

Table V

ACID RESISTANCE (HOURS' RESISTANCE BEFORE FAILURE OCCURRED)

| Coating Material | 95% sulfuric acid at 25° C. | 50% sulfuric acid at 25° C. | 70% nitric at 25° C. | Glacial acetic at 25° C. |
|---|---|---|---|---|
| 1. Phenol-formaldehyde diethylene triamine resin (Ex. 1) | [1] | [1] | 2.5 | [1] |
| 2. Phenol-formaldehyde heat-hardenable baking lacquer | 0.25 | 200 | 0.25 | 200 |
| 3. Cresol-formaldehyde heat-hardenable lacquer | 0.2 | | 0.25 | 50 |
| 4. Cresol-formaldehyde heat-hardenable baking lacquer | 0.05 | | 0.1 | 20 |
| 5. M-xylenol-formaldehyde heat-hardenable baking lacquer | 0.2 | | | |

[1] Good for 5 months.

The alkylene polyamine modified resins when cured to the "C" stage are also resistant to many organic solvents, such as ketones, esters, alcohols, glycol ethers and aromatic hydrocarbons. As exemplified by the coating material described in Example 1 they have excellent adhesion to metal surfaces particularly such metals as aluminum and its alloys. Exposure of aluminum and aluminum copper alloy panels having a baked coating of the resin described in Example 1 to heat-degrade ethylene glycol under conditions simulating the alternate heating and cooling cycles of internal combustion engines using the glycol as a cooling fluid (45 cycles consisting of 9 hours at 120° C. and 15 hours at room temperature) demonstrated the efficacy of the coating in protecting the aluminum against the corrosive attack of the glycol and the resistance of the coating to the solvent action of the glycol. The baked coatings were also resistant to refluxing ethylene glycol monoethyl ether and phenol at 150° C. In salt spray at 35° C., a scribed 0.5 mil baked film on a cold rolled steel panel showed no failure in 200 hours and after 580 hours showed only one-eighth inch undercutting from the scratch.

What is claimed is:

1. Aqueous solution of a heat-convertible stable liquid resin capable of being dehydrated to a non-gelled, glycol-monoether soluble, fusible product adapted for impregnating paper, textile and asbestos sheets, said resin consisting of the water-soluble reaction product of (1) an undehydrated methylol containing condensation product of one mol of phenol per se and between one and three mols of formaldehyde and (2) an alkylene polyamine having at least two nitrogen atoms and at least three replaceable hydrogen atoms attached to said nitrogen atoms, said polyamine being in proportions between 1/$f$ mol and one mol per mol of phenol where $f$ is an integer equivalent to the sum of said replaceable hydrogen atoms, the reaction product having been obtained by reacting the methylol condensate and the polyamines in the presence of less than one mol free formaldehyde per mol of polyamine, and with a total amount of formaldehyde above equimolar proportions with said phenol not in excess of two mols per mol of the polyamine.

2. A fusible, heat-reactive resin being the dehydrated, non-gelled, glycol monoether-soluble, resinous reaction product solely of a methylol containing condensate of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in molar proportions between a minimum of 1/$f$ mol and a maximum of one mol per phenolic hydroxyl in said condensate, where $f$ is an integer equivalent to the sum of said hydrogen atoms, the amount of formaldehyde in excess of equimolar proportions for reaction with the phenol to form said condensate being not more than two mols per mol of polyamine subsequently reacted with said condensate.

3. A fusible, heat-reactive resin being the dehydrated, non-gelled, glycol monoether-soluble, resinous reaction product solely of a methylol containing condensate of a substantially equimolar reaction mixture of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in molar proportions between a minimum of $1/f$ mol and one mol per phenolic hydroxyl in said condensate, where $f$ is an integer equivalent to the sum of said hydrogen atoms, and in admixture with said dehydrated reaction product, a methylene engendering agent selected from the group consisting of hexamethylenetetramine, formaldehyde, and its polymers in amount contributing up to two methylene groups per mol of said polyamine.

4. A fusible, heat-reactive resin being the dehydrated non-gelled, glycol monoether-soluble, reaction product solely of a methylol containing condensate of a substantially equimolar reaction mixture of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in a molar proportion of substantially $1/n$ mol of polyamine per phenolic hydroxyl in said condensate, where $n$ is an integer equivalent to the sum of said nitrogen atoms, and the amount of formaldehyde for reaction in said condensate above equimolar proportions being not in excess of two mols per mol of said polyamine.

5. A fusible, heat-reactive resin being the dehydrated non-gelled, glycol monoether-soluble, reaction product solely of a methylol containing condensate of a substantially equimolar reaction mixture of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in a molar proportion of substantially $1/n$ mol of polyamine per phenolic hydroxyl in said condensate, where $n$ is an integer equivalent to the sum of said nitrogen atoms, and in admixture with said dehydrated reaction product, a methylene engendering agent selected from the group consisting of hexamethylenetetramine, formaldehyde and its polymers in amount contributing up to two methylene groups per mol of said polyamine.

6. A fusible, heat-reactive resin being the dehydrated non-gelled, glycol monoether-soluble, reaction product solely of a methylol containing condensate of a substantially equimolar reaction mixture of formaldehyde and a phenol having at least three reactive positions, said phenol having only one phenolic hydroxyl group per phenyl ring with ethylene diamine in a molal quantity between ¼ and 1 mol per phenolic hydroxyl in said condensate, the amount of formaldehyde for reaction in said condensate above equimolar proportions being not in excess of two mols per mol of said polyamine.

7. A fusible, heat-reactive resin being the dehydrated non-gelled, glycol monoether-soluble, reaction product solely of a methylol containing condensate of a substantially equimolar reaction mixture of formaldehyde and a phenol having at least three reactive positions, said phenol having only one phenolic hydroxyl group per phenyl ring with diethylene triamine in a molal quantity between ⅕ and 1 mol per phenolic hydroxyl in said condensate, the amount of formaldehyde for reaction in said condensate above equimolar proportions being not in excess of two mols per mol of said polyamine.

8. A fusible, heat-reactive resin being the dehydrated non-gelled, glycol monoether-soluble, reaction product solely of a methylol containing condensate of a substantially equimolar reaction mixture of formaldehyde and a phenol having at least three reactive positions, said phenol having only one phenolic hydroxyl group per phenyl ring with triethylene tetramine in a molal quantity between ⅙ and 1 mol per phenolic hydroxyl in said condensate, the amount of formaldehyde for reaction in said condensate above equimolar proportions being not in excess of two mols per mol of said polyamine.

9. A heat-convertible, fusible resin, being the dehydrated, non-gelled reaction product solely of a dehydrated methylol containing condensate of a substantially equimolar reaction mixture of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in molar proportions between a minimum of $1/f$ mol and a maximum of one mol per phenolic hydroxyl in said condensate, where $f$ is an integer equivalent to the sum of said hydrogen atoms, the amount of formaldehyde in excess of equimolar proportions for reaction with the phenol being not in excess of two mols per mol of polyamine reacted with said condensate.

10. A heat-convertible resin, being the non-gelled, glycol monoether-soluble, dehydrated reaction product solely of a dehydrated methylol containing condensate of a substantially equimolar reaction mixture of formaldehyde and a phenol having at least three reactive positions, said phenol having only one phenolic hydroxyl group per phenyl ring, with a straight chain alkylene polyamine having at least two nitrogen atoms and at least three replaceable hydrogen atoms attached to said nitrogen atoms, said polyamine being in molar proportions between a minimum of $1/f$ mol and a maximum of one mol per phenolic hydroxyl in said condensate, where $f$ is an integer equivalent to the sum of said hydrogen atoms, and in admixture with said dehydrated reaction product, a methylene engendering agent selected from the group consisting of hexamethylenetetramine, formaldehyde and its polymers in amount contributing up to two methylene groups per mol of said polyamine.

11. A heat-convertible composition comprising the product of claim 2 dispersed in a volatile organic solvent.

12. A heat-convertible molding composition comprising the product of claim 2 in admixture with a filler.

13. A heat-convertible coating composition comprising the product of claim 9 dispersed in volatile solvent including a glycol monoether.

14. A heat-convertible coating composition comprising the product of claim 9 dispersed in ethylene glycol monoether.

15. A heat-convertible resinous composition comprising as the sole reactive components a mixture of a methylol containing condensate of formaldehyde and a phenol having at least three reactive positions, said phenol having only one phenolic hydroxyl per phenyl ring and a methylol containing condensate of formaldehyde and an open chain alkylene polyamine having at least two nitrogen atoms and at least three replaceable hydrogen atoms attached to said nitrogen atoms, the ratio of said polyamine condensate to phenol condensate in the mixture being such that there is present of the polyamine condensate an amount equivalent to that providing per phenolic hydroxyl of the phenolic condensate between $1/f$ mol and 1 mol of the polyamine as its reaction product with formaldehyde, $f$ being an integer equivalent to the sum of the hydrogen atoms attached to the nitrogen atoms of the polyamine, and the amount of formaldehyde reacted with the phenol being substantially in equimolar proportions and the amount of formaldehyde reacted with the polyamine being not in excess of two mols per mol of polyamine.

16. Process which comprises heat-converting at a temperature between 160° and 220° C. the fusible resin of claim 2.

17. Process which comprises baking at a temperature between 160° and 220° C. a coating composition comprising a volatile solvent including a glycol monoether and the fusible resin of claim 9.

18. Process for molding a thermosetting molding composition, which comprises admixing the heat-convertible resin of claim 10 with a filler, and pressure molding the mixture at a temperature above 160° C. and below its decomposition temperature until the resin is cured to the "C" stage.

19. An infusible resin obtained by heat-converting at a temperature between 160° and 220° C. the fusible resin of claim 2.

20. A metal base coated with an infusible coating prepared by baking on said base at a temperature between 160° and 220° C., a coating composition comprising the fusible resin of claim 9 dispersed in volatile solvent including a glycol monoether.

21. A heat-convertible coating composition comprising volatile solvent including a glycol monoether and in solution in said solvent a fusible, soluble, heat-reactive resin being the dehydrated reaction product of a methylol containing condensate of a substantially equimolar reaction mixture of formaldehyde and a phenol having at least three reactive positions, said phenol having only one phenolic hydroxyl group per phenyl ring, reacted with solely a straight chain alkylene polyamine having at least two nitrogen atoms each containing replaceable hydrogen atoms attached thereto, the total number of said hydrogen atoms being more than two, said polyamine being in molar proportions between $1/f$ and one mol per phenolic hydroxyl in said condensate, where $f$ is an integer equivalent to the sum of said hydrogen atoms, to form a fusible, soluble resin, said resin having been further reacted with solely a methylene engendering agent selected from the group consisting of hexamethylenetetramine, formaldehyde and its polymers in an amount contributing up to two methylene groups per mol of said polyamine to form an alcohol-insoluble, glycol monoether-soluble, fusible resin.

22. Alkali-resistant molded article obtained by pressure molding at a temperature between 160° and 220° C. until fusible, a composition comprising a filler and a fusible, alcohol-soluble, heat-reactive resin being the dehydrated reaction product of a methylol containing condensate of substantially equimolar proportions of formaldehyde and a phenol having at least three reactive positions per phenyl ring, said phenol having only one phenolic hydroxyl group per phenyl ring, with solely a straight chain alkylene polyamine having at least two nitrogen atoms and at least three replaceable hydrogen atoms attached to said nitrogen atoms, said polyamine being in molar proportions between a minimum of $1/f$ mol and one mol per phenolic hydroxyl in said condensate, where $f$ is an integer equivalent to the sum of said hydrogen atoms, the said methylol condensate containing less than one mol free formaldehyde per mol of polyamine reacted with said condensate, and in admixture with said dehydrated reaction product, a methylene engendering agent selected from the group consisting of hexamethylenetetramine, formaldehyde and its polymers in amount contributing up to two methylene groups per mol of said polyamine.

RICHARD K. WALTON.

REFERENCES CITED

The following references are of record in the file of this patent:

UNITED STATES PATENTS

| Number | Name | Date |
|---|---|---|
| 1,989,243 | Nash et al. | Jan. 29, 1935 |
| 2,098,869 | Harmon et al. | Nov. 9, 1937 |
| 2,356,151 | Eastes | Aug. 22, 1944 |
| 2,402,384 | Eastes | June 18, 1946 |
| 2,421,852 | Rogers et al. | June 10, 1947 |
| 2,452,005 | Weltman et al. | Oct. 19, 1948 |